United States Patent [19]

Shioka et al.

[11] Patent Number: 5,369,642

[45] Date of Patent: Nov. 29, 1994

[54] SWITCHER FOR REDUNDANT SIGNAL TRANSMISSION SYSTEM

[75] Inventors: Masashi Shioka; Kazuya Kikuchi, both of Tokyo, Japan

[73] Assignee: NEC Corporation, Japan

[21] Appl. No.: 892,249

[22] Filed: Jun. 2, 1992

[51] Int. Cl.⁵ .......................... G06F 11/00
[52] U.S. Cl. .................. 371/8.2; 371/11.2; 371/20.1
[58] Field of Search ............ 371/8.2, 7, 8.1, 5.5, 371/11.2, 20.1, 18, 29.1, 15.1, 20.2, 68.1, 9.1, 32, 68.2; 455/59, 133, 134, 135, 136, 8; 340/825.01, 827; 370/16, 8, 24, 41, 58.1; 375/38, 10, 40, 102, 114, 100

[56] References Cited

U.S. PATENT DOCUMENTS

| | | | |
|---|---|---|---|
| 3,614,401 | 10/1971 | Lode | 340/146.1 |
| 3,714,666 | 1/1973 | Guidi | 340/259 |
| 3,922,537 | 11/1975 | Jackson | 235/153 AC |
| 4,075,440 | 2/1978 | Laubengayer | 340/147 SC |
| 4,320,508 | 3/1982 | Takezoe | 371/22 |
| 4,797,903 | 1/1989 | Itoh | 371/8.2 |
| 4,922,449 | 5/1990 | Donaldson et al. | 364/900 |
| 4,984,252 | 1/1991 | Morimoto | 375/38 |
| 5,057,938 | 10/1991 | Edamura | 371/32 |
| 5,097,467 | 3/1992 | Taniguchi | 371/8.2 |

*Primary Examiner*—Robert W. Beausoliel, Jr.
*Assistant Examiner*—Dieu-Minh Le
*Attorney, Agent, or Firm*—Ostrolenk, Faber, Gerb & Soffen

[57] ABSTRACT

A switcher applicable to a redundant signal transmission system and capable of maintaining impedance matching when an input line associated with a faulty active transmitter is connected to a standby transmitter. The switcher may have first switching circuit assigned to the standby transmitter, a plurality of second switching circuits associated one-to-one with a plurality of active transmitters, and a pair of connection lines cascading the first and second switching circuits. When a faulty active transmitter is replaced with the standby transmitter, relay switches constituting the first and second switching circuits disconnect portions of the connection lines which are more remote, from the first switching circuit than the second switching circuit means associated with the faulty active transmitter.

2 Claims, 3 Drawing Sheets

SWITCHER FOR REDUNDANT SIGNAL TRANSMISSION SYSTEM

BACKGROUND OF THE INVENTION

1. Field of the Invention

The present invention relates to a switcher for a signal transmission system of the type used for transmitting signals which are time-division or frequency-division multiplexed on a high frequency carrier, e.g., carrier-frequency terminal equipment for transmitting electric signals.

2. Description of the Background Art

With a communication system including the above-described type of transmitter using a high frequency carrier, it is a common practice to assign a single standby transmitter to several active transmitters for insuring reliable communication lines. When any one of the active transmitters becomes faulty, the transmission line is switched from the faulty active transmitter to the standby transmitter. To switch the transmission line, a switch is interposed between the input terminal of each of the active and standby transmitters and the line terminal on the input side, and between the output terminal and the line terminal on the output side. When one of the active transmitters fails, a drive signal is fed to the switches either manually or automatically.

As the frequency of a high frequency carrier to be transmitted over the transmission line which should be switched as stated above exceeds a certain value, strict impedance matching is required between the switches or the switcher and the individual transmitters. For example, assume a switcher handling digital signals produced by time-division multiplexing thirty-two voice channels and having a bit rate of 2048 bits per second. Then, a prerequisite is that the impedance of the switcher as viewed from the input of the transmitter, i.e., from the input of the switcher, be equal to the characteristic impedance of the input line. If the impedance of the switcher changes every time the switcher is driven, the output signal of the transmitter will fluctuate, preventing the communication line from being reliable.

On the other hand, a switcher heretofore incorporated in carrier-frequency terminal equipment of the type used for handling the above-stated high frequency signals is so constructed as to set up, on the replacement of the faulty active transmitter with the standby transmitter, a circuit for connecting a test signal generator to the faulty transmitter. For this purpose, the individual switches of the switcher are connected in a chain configuration. The chain connects the input line terminal and output line terminal of the faulty transmitter and the input and output terminals of the standby transmitter and connects the test signal generator to the faulty transmitter. This prevents the impedance matched condition from being maintained since the chain of the switches eventually connects, after the replacement of the faulty transmitter with the standby transmitter, a line piece which renders the other end of the chain open to the input end of the standby transmitter. Although the switches may be connected in a matrix configuration in place of the chain configuration, the matrix configuration makes for large arrangement of cables on a rack at both of the input and output line sides, thereby interfering with the miniaturization of the apparatus at the terminal station.

OBJECT OF THE INVENTION

It is therefore an object of the present invention to provide a switcher that assuredly provides impedance matching between switches and a standby transmitter without adversely affecting the miniaturization of terminal equipment.

It is another object of the present invention to provide a switcher having means for connecting, when a faulty active transmitter is replaced with a standby transmitter, a test signal generator to the faulty transmitter while maintaining an impedance matched condition.

BRIEF DESCRIPTION OF THE DRAWINGS

The above-mentioned and other objects, features and advantages of the present invention will become more apparent by reference to the following detailed description of embodiments of the invention taken in conjunction with the accompanying drawings, wherein.

DETAILED DESCRIPTION OF THE PREFERRED EMBODIMENTS

Figure 1:
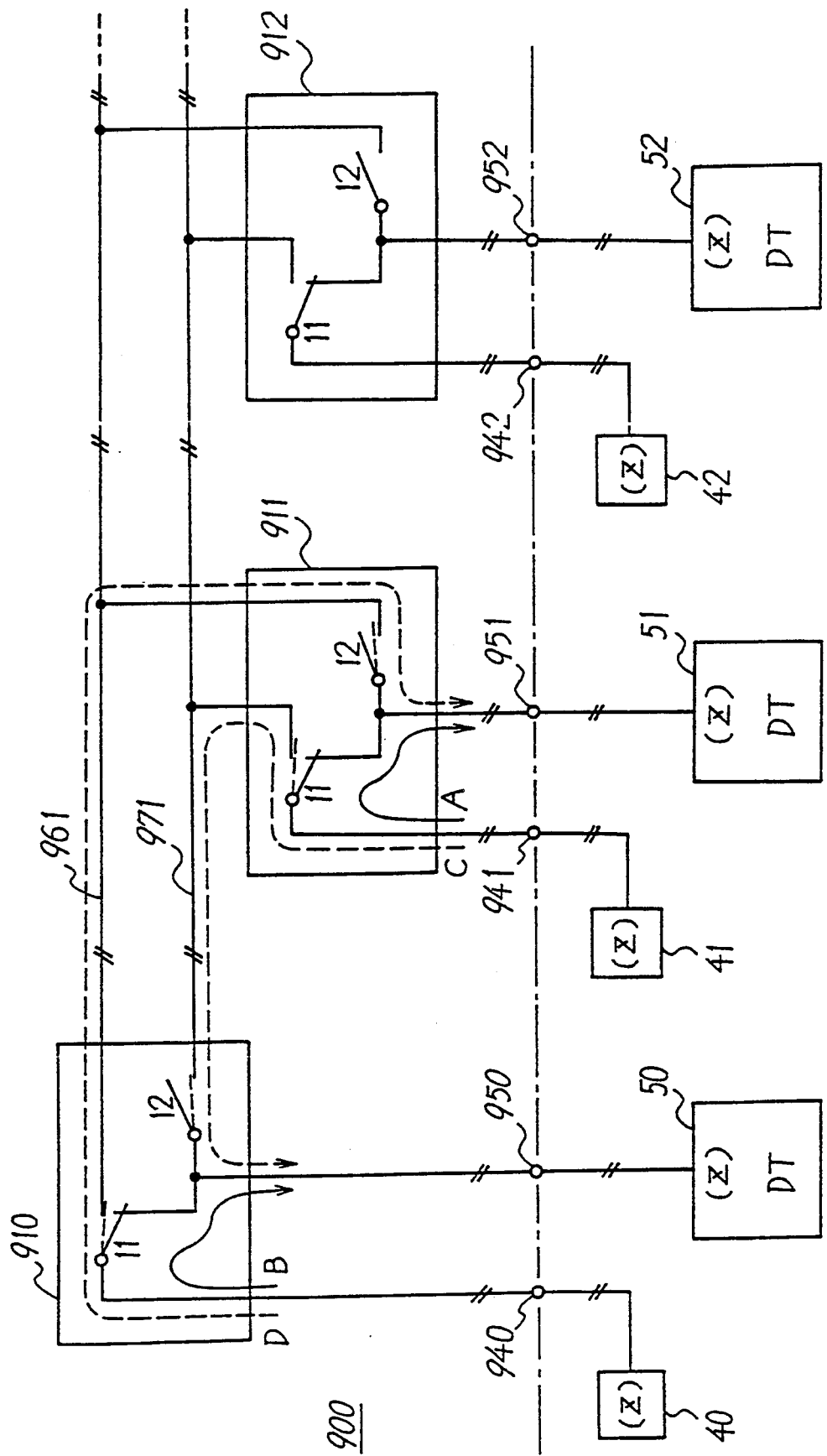
FIG. 1 is a circuit diagram showing a conventional switcher for a redundant signal transmission system.

To better understand the present invention, brief reference will be made to a prior art switcher, shown in FIG. 1. As shown, the switcher, generally 900, includes a relay type switching circuit 910 having switches 11 and 12 which are connected to an input and an output terminal 940 and 950, respectively. A switching circuit 911 also has switches 11 and 12 which are connected to an input and an output terminal 941 and 951, respectively. Signal lines 961 and 971 are respectively connected to the switches 11 and 12 of the switching circuit 910 at one end and to the switches 11 and 12 of the switching circuit 911 at the other end. The extensions of the signal lines 961 and 971 are respectively connected to switches 11 and 12 which are included in a switching circuit 912. The switches 11 and 12 of the switching circuit 912 are connected to an input and an output terminal 942 and 952, respectively. Specifically, the common contact of the switch 11 incorporated in the switching circuit 910 is connected to the input terminal 940. A standby input signal source 40 is connected to the input terminal 940. The break contact of the switch 11 and the common contact of the switch 12 both are connected to the output terminal 950. A standby transmitter (DT) 50 is connected to the output terminal 950. An input signal source 41 and an active transmitter (DT) 51 are respectively connected to the input terminal 941 and the output terminal 951 which are connected to the switching circuit 911. Likewise, an input signal source 42 and an active transmitter (DT) 52 are respectively connected to the input terminal 942 and the output terminal 952 which are connected to the switching circuit 912. The make contact of the switch 11 of the switching circuit 910 is connected to the make contacts of the switches 12 of the switching circuits 911 and 912 by the signal line 961. The make contact of the switch 12 of the switching circuit 910 is connected to the make contacts of the switches 11 of the switching circuits 911 and 912 by the signal line 971. To cope with the frequency of the transmission signal, the signal line 961 is implemented as a pair line while the switches and input and output terminals are each provided with a bipolar configuration. The number of such switching circuits may be increased with the increase in the number of transmitters (DT) to be switched.

In a faultless condition, all the switching circuits 910–912 have the common contacts of their switches 11 connected to the respective break contacts while having their switches 12 held in an open state. In this configuration, the active DT 51, for example, is connected to the input signal source 41 by a path A while the standby DT 50 is connected to the standby input signal source 40 by a path B and, therefore, ready to operate. Assume that the standby DT 50 should be substituted for the active DT 51 due to a fault or similar cause occurring in the latter. Then, the switches 11 of the switching circuits 910 and 911 have their common contacts connected to the associated make contacts, and the switch 12 is made (as indicated by dotted lines in the figure). As a result, a signal from the input signal source 41 is fed to the DT 50 over a path C. On the other hand, the DT 51 is connected to the standby input signal line 40 by a path D. By using the standby input signal source 40 as a test signal source, it is possible to deliver a test signal to the faulty DT 51 for the purpose of locating the fault.

To eliminate waveform distortion and falling of the levels of the transmission signals, it is necessary that the switching circuits 910–912 be impedance-matched between the signal sources 40–42 and the DTs 50–52. For this purpose, the signal lines 961 and 971 are each implemented as a balanced two-core cable whose impedance is equal to the characteristic impedance Z of the input signal sources 40–42 and DTs 50–52 connected to the input terminals 940–942 and output terminals 950–952.

As stated above, the path A extending from the input terminal 941 to the output terminal 951 is replaced with the path C extending to the output terminal 950 while the path B extending from the input terminal 940 to the output terminal 950 is replaced with the path D extending to the output terminal 951. In this condition, the signal line 961 is connected to the input terminal 940 and output terminal 951 at opposite ends thereof. Likewise, the signal line 971 is connected to the input terminal 941 and output terminal 950 at opposite ends thereof. Since all the switching circuits 910–912 are connected in parallel, the extensions of the signal lines 961 and 971 are also connected to the output terminal 952 and the input terminal 942, respectively. However, since the extensions of the signal lines 961 and 971 are not terminated, the impedance as viewed from the output terminals 950 and 951 does not coincide with the characteristic impedance Z due to, for example, stray capacity, distorting the waveforms and lowering the levels of transmission signals.

Figure 2:
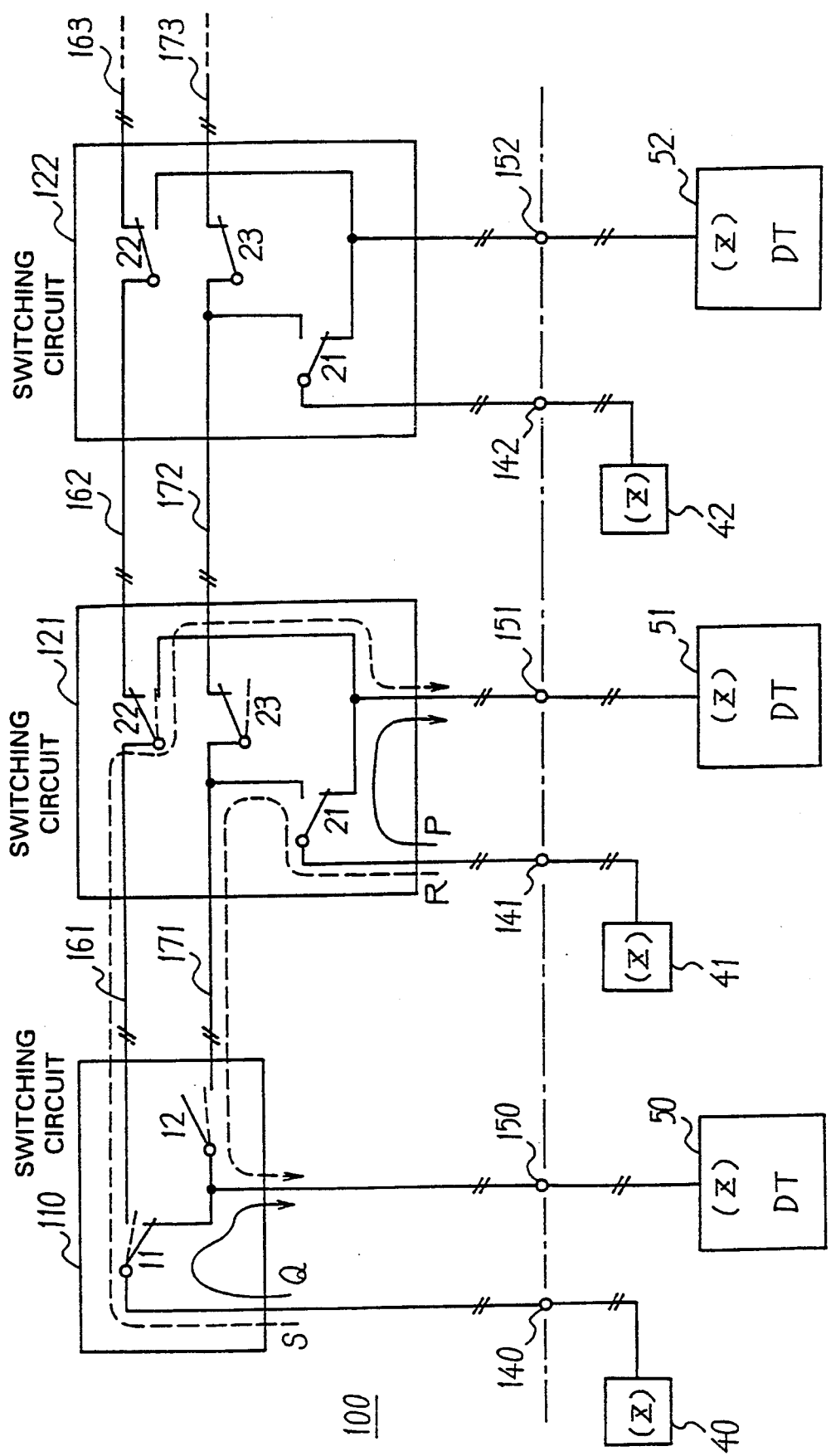
FIG. 2 is a circuit diagram showing a switcher embodying the present invention.

A reference will be made to FIG. 2 for describing a switcher embodying the present invention. As shown, the switcher, generally 100, has a first type of switching circuit 110 and two second type of switching circuits 121 and 122. The first type of switching circuit 110 has switches 11 and 12 and is connected to an input terminal 140 and an output terminal 150. The second type of switching circuits 121 and 122 each has switches 21, 22 and 23 and are respectively connected to an input and an output terminal 141 and 151 and an input and an output terminal 142 and 152. Signal lines 161 and 171 connect the switching circuits 110 and 121 while signal lines 162 and 172 connect the switching circuits 121 and 122. In the switching circuit 110, the common contact of the switch 11 is connected to the input terminal 140, and the break contact of the switch 11 and the common contact of the switch 12 both are connected to the output terminal 150. The switches 21 of the switching circuits 121 and 122 have their con, non contacts connected to the input terminals 141 and 142, respectively. The break contacts of the switches 21 of the switching circuits 121 and 122 are connected to the output terminals 151 and 152, respectively, together with the make contacts of the switches 22. The make contact of the switch 11 of the switching circuit 110 is connected to the common contact of the switch 22 included in the switching circuit 121 by the signal line 161. The make contact of the switch 12 of the switching circuit 110 is connected to the make contact of the switch 21 and the common contact of the switch 23 which are included in the switching circuit 121 by the signal line 171. The break contact of the switch 22 of the switching circuit 121 is connected to the common contact of the switch 22 of the switching circuit 122 by the signal line 162. The break contact of the switch 23 of the switching circuit 121 is connected by the signal line 172 to the make contact of the switch 21 and the common contact of the switch 23 of the switching circuit 122. A standby input signal source 40 and active input signal sources 41 and 42 are connected to the input terminals 140, 141 and 142, respectively. A standby transmitter (DT) 50 and active transmitters (DT) 51 and 52 are connected to the output terminals 150, 151 and 152, respectively.

The signal lines 161, 162, 171 and 172, as well as other signal lines, are each implemented as a balanced two-core line and each has a characteristic impedance equal to the input impedance of DTs, as in the conventional circuitry of FIG. 1. Also, the switches and input and output terminals are each in a bipolar configuration. Alternatively, the signal lines may be constituted by coaxial cables, in which case single-pole switches and coaxial connectors are used as the switches and the input and output terminals, respectively.

The number of switching circuits and that of signal lines may be increased in matching relation to the number of DTs. To add a switching circuit to the switcher 100, an additional second type of switching circuit is connected to the break contact of the switch 22 of the switching circuit 122 and the break contact of the switch 23 of the circuit 122 via a pair of signal lines 163 and 173. A further switching circuit can be added to the switcher 100 if such a signal line pair and a second type of switching circuit are connected in the same way.

In operation, so long as the switcher 100 is free from fault, the switching circuit 110 has the common contact of the switch 11 connected to the break contact and the switch 12 is held open. In each of the other switching circuits 121 and 122, the common contacts of the switches 21, 22 and 23 are connected to the associated break contacts. Such a configuration is indicated by solid lines in FIG. 2. In this condition, the active DTs 51 and 52 are connected to the active input signal sources 41 and 42, respectively (see the path P). The standby DT 50 is connected to the standby input signal source 40 by a path Q, ready to operate at any time.

Assume that the active DT 51 should be replaced with the standby DT 50 due to a fault thereof. Then, all the switches of the switching circuits 110 and 121 are operated at the same time. Specifically, the switching circuit 110 has the common contacts of the switches 11 and 12 connected to the associated make contacts, while the switching circuit 121 has the common contacts of the switches 21 and 22 connected to the associated make contacts and has the switch 23 opened, as indicated by dotted lines in FIG. 2. As a result, the path P extending from the input terminal 141 to the output terminal 151 is replaced with a path R extending from the input terminal 141 to the output terminal 150, and the path Q extending from the input terminal 140 to the output terminal 150 is replaced with a path S extending from the input terminal 140 to the output terminal 151. Therefore, a signal from the input signal source 41 is fed to the standby DT 50. At the same time, the DT 51 is connected to the standby input signal source 40 so as to receive a test signal therefrom for locating the fault and preparing for repair.

In the above configuration, only the signal line 171 is connected to the input terminal 141 and output terminal 150, i.e., the signal line 172 associated with the switching circuit 122 is disconnected. Hence, the impedance as viewed from the output terminal 150 is identical with the characteristic impedance Z. Likewise, since only the signal line 161 is connected to the input terminal 140 and output terminal 151 with the signal line 162 disconnected, the impedance as viewed from the output terminal 151 is the same as the characteristic impedance Z. This prevents the waveforms of signals propagating to the DTs 50 and 51 via the switcher 100 from being distorted.

To substitute the standby DT 50 for the active DT 52, all the switches of the switching circuits 110 and 122 are operated at the same time to connect the signal lines 171 and 172 to the input terminal 142 and output terminal 150 and to connect the signal lines 161 and 162 to the input terminal 140 and output terminal 152. Then, the impedances as viewed from the output terminals 150 and 152 are identical with the characteristic impedance Z despite the signal lines 163 and 173 which may be incorporated to connect an extra switching circuit.

It is to be noted that the switches constituting each switching circuit are so selected as to set up a desired characteristic impedance on the connection paths. While such switches may be operated either manually or automatically so long as a desired characteristic impedance is obtainable, they are usually implemented by electromagnetic relays or relays using semiconductor devices.

Figure 3:
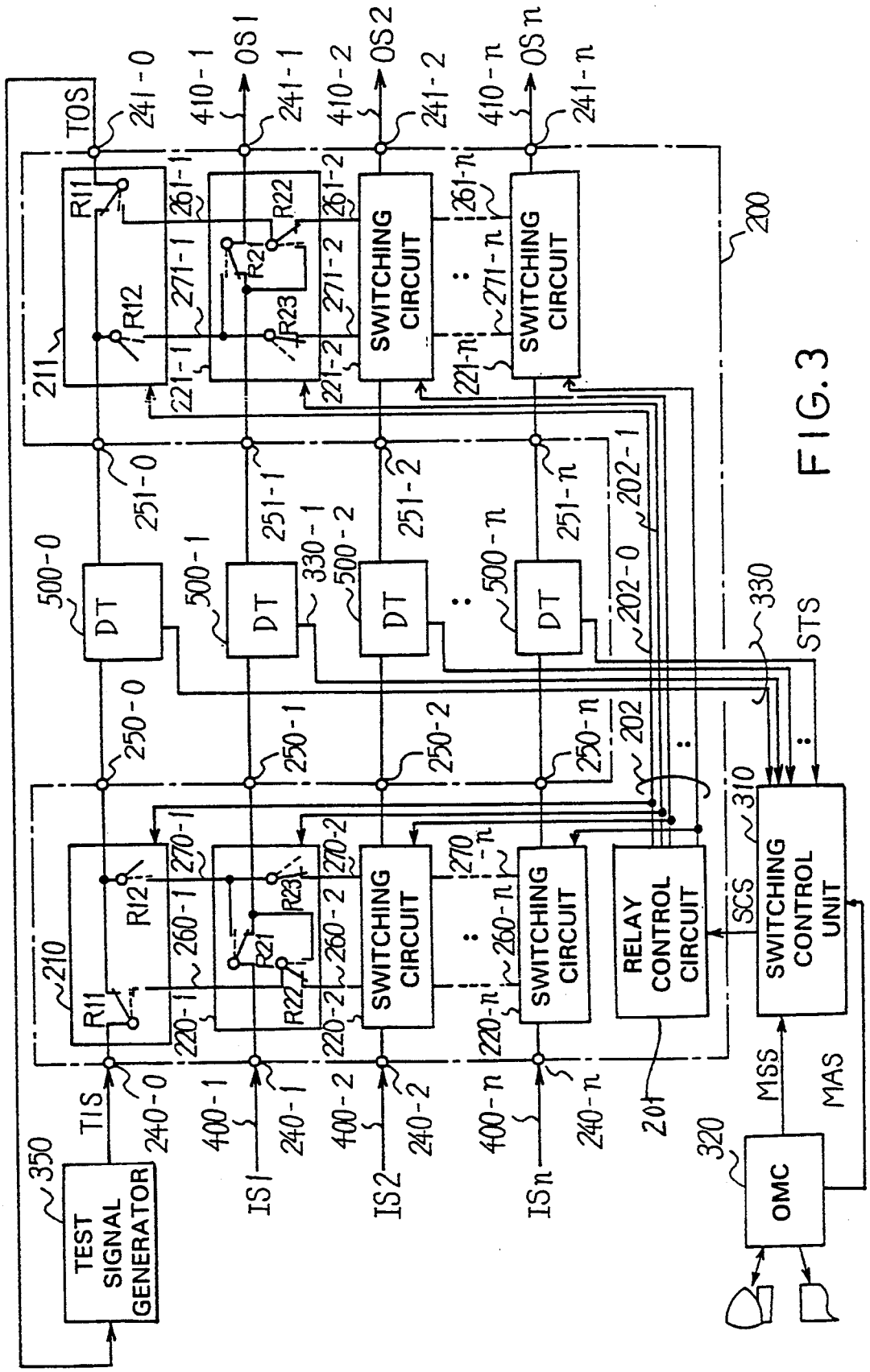
FIG. 3 is a circuit diagram showing an alternative embodiment of the present invention.

Referring to FIG. 3, an alternative embodiment of the present invention is shown. As shown, the switcher, generally 200, has a first type of switching circuit 210 and n (2 or greater integer) second type of switchint circuits 220-1 to 220-n. The switching circuits 210 and 220-1 to 220-n are connected together by 2 n signal lines 260-1 to 260-n and 270-1 to 270-n and located at the input side of n+1 transmitters (DT) 500-0 to 500-n including one standby transmitter. A first type of switching circuit 211 and n second type of switching circuits 221-1 to 221-n are connected together by 2 n signal lines and located at the output side of the DTs 500-0 to 500-n.

An operation and maintenance center (OMC) 320 has a keyboard, display, printer and other similar equipment and controls the entire transmission system as instructed by an operator. The reference numeral 310 designates a switching control unit. When the OMC 320 delivers a select signal MAS indicative of the manual switching operation of the switcher 200 to the switching control unit 310, the control unit 310 sends a switching control signal SCS to the switcher 200 to cause it to perform the desired switching operation. When the select signal MAS is indicative of an automatic switching operation, the switching control unit 310 receives status signals STS from the DTs 500-0 to 500-n over respective status signal lines 330. As any one of the status signals STS indicates a fault, the switching control unit 310 sends a switching control signal SCS to the switcher 200 for replacing one of the active DTs 500-1 to 500-n which is faulty with the standby DT 500-0. In response to the switching control signal SCS, a relay control circuit 201 included in the switcher 200 selects one of the pairs of switching circuits 220-1 to 220-n and 221-1 to 221-n, and feeds a drive current to them as well as to the switching circuits 210 and 211.

In operation, when the switcher 200 is faultless, a drive current is not fed to any of the switching circuits 210 and 211, 220-1 to 220-n, and 211-1 to 221-n, so that relays R11, R12, R21, R22 and R23 are held in their initial state (indicated by solid lines in FIG. 3). In this condition, the signal input portions of the DTs 500-1 to 500-n are respectively connected to the input terminals 240-1 to 240-n via the output terminals 250-1 to 250-n and switching circuits 220-1 to 220-n (break and common contacts of relays R21). Therefore, input signals IS1 to ISn from external lines 400-1 to 400-n are applied to the DTs 500-1 to 500-n, respectively. On the other hand, the signal output portions of the DTs 500-1 to 500-n are respectively connected to output terminals 241-1 to 241-n via the input terminals 251-1 to 251-n and switching circuits 221-1 to 221-n (break and common contacts of relays R21). Hence, output signals OS1 to OSn resulting from the associated input signals appear on output lines 410-1 to 410-n. The signal input portion of the standby DT 500-0 is connected to the input terminal 240-0 via the output terminal 250-0 and switching circuit 210 (break and make contact of relay R11). A signal TIS is fed from a test signal generator 350 to the standby DT 500-0. The signal output portion of the DT 500-0 is connected to an output terminal 241-0 via the input terminal 251-0 and switching circuit 211 (break and common contacts of relay R11), whereby an output signal TOS resulting from the input signal TIS is delivered to the test signal generator 350. The test signal generator 350 checks the input signal TOS to see if the standby DT 500-0 is normal, so that the DT 500-0 may be substituted for a faulty DT 500 any time.

Assume that a fault has occurred in the DT 500-1 while the select signal MAS from the OMC 320 is indicative of an automatic switching mode. Then, the switching control unit 310 recognizes the fault of the DT 500-1 in response to the status signal STS on the status signal line 330-1. The switching control unit 310 sends a switching control signal SCS to the relay control circuit 201 for commanding it to substitute the standby DT 500-0 for the faulty DT 500-1. In response, the relay control circuit 201 feeds a relay drive current to a relay drive line 202-0 assigned to the switching circuits 210 and 211 and a drive line 202-1 assigned to the circuit 220-1 and 221-1. As a result, the relays R11 and R12 of the switching circuits 210 and 211 and the relays R21, R22 and R23 of the switching circuits 220-1 and 221-1 are energized to bring their contacts to positions indicated by dotted lines in FIG. 3. In such a configuration, the signal IS1 arrived at the input terminal 240-1 is routed to the DT 500-0 via the switching circuit 220-1 (common and make contacts of relay R21), switching circuit connect signal line 270-1, switching circuit 210 (make and common contacts of relay R12), and output terminal 250-0, whereby the processing is continued without interruption. At this instant, since the relay R23 of the switching circuit 220-1 is open, the signal line 270-2 is disconnected from the signal line 270-1, as in the previous embodiment. The output of the DT 500-0 is delivered as an output signal OS1 to the output terminal 241-1 via the input terminal 250-0, switching circuit 211 (common and make contacts of relay R12), signal line 271-1, and switching circuit 221-1 (make and common contacts of relay R21). Since the relay R23 of the switching circuit 221-1 is open, the signal line 271-2 is also disconnected from the signal line 271-1.

On the other hand, the DT 500-1 is connected to the test signal generator 350 by the signal lines 260-1 and 261-1 to receive the signal TIS for fault detection while returning the signal TOS. At this instant, the DT 500-1 is not connected to the signal line 260-2 or the signal line 261-2.

As stated above, this embodiment replaces the paths assigned to the input signals IS1-ISn and output signals OS1-OSn of active transmitters and the paths assigned to the input signal TIS and output signal TOS of a standby transmitter, as needed. Since a non-terminated signal line is not connected to any of such signal paths, the embodiment, like the previous embodiment, maintains an impedance matched condition to thereby prevent signal waveforms from being deformed and prevent signal levels from being lowered.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A switcher for a redundant signal transmission system, comprising:
   a plurality of active transmitters and at least one standby transmitter arranged in parallel with one another for processing high frequency signals coming in through respective input lines;
   means for detecting when a fault occurs in a faulty one of said active transmitters, to thereby generate a fault signal; and
   a switching system responsive to said fault signal for switching the input line associated with said faulty active transmitter to said standby transmitter via a signal line,
   said switching system comprising an impedance matching system for maintaining impedance matching between said standby transmitter and said signal line when said switching system switches the signal line to said standby transmitter;
   said impedance matching system comprising a first switching circuit associated with said standby transmitter, a plurality of second switching circuits associated one-to-one with said plurality of active transmitters, and a pair of connection lines continuously cascading said first and second switching circuits;
   said first switching circuit comprising:
   a first switch having a make contact connected to one of said pair of connection lines, and a break contact connected to said standby transmitter; and
   a second switch having a common contact connected to said standby transmitter, and a make contact connected to the other of said pair of connection lines;
   said plurality of second switching circuits each comprising:
   a third switch having a break contact serially connected to one of said pair of connection lines, and a make contact connected to an associated one of said active transmitters;
   a fourth switch having a break contact serially connected to the other of said pair of connection lines; and
   a fifth switch having a movable contact connected to an associated one of said input lines, a break contact connected to an associated one of said active transmitters, and a make contact connected to the other said pair of connection lines;
   such that said input line is switched from said faulty active transmitter to said standby transmitter in response to said fault signal, and said third and fourth switches interrupt cascade connection of said plurality of second switching circuits by said pair of connection lines, in response to said fault signal.

2. A switcher as claimed in claim 1, further comprising a test signal source connected to a movable contact of said first switch for feeding, when any one of said active transmitters is replaced with said standby transmitter in response to said fault signal, a test signal to said one active transmitter via said first and third switches.

* * * * *